(12) United States Patent
Umbach et al.

(10) Patent No.: US 11,524,732 B2
(45) Date of Patent: Dec. 13, 2022

(54) MACHINE SYSTEM HAVING MACHINERY ROLLER ASSEMBLY WITH STATIC SEALING CLAMPING COLLARS

(71) Applicant: Caterpillar Inc., Deerfield, IL (US)

(72) Inventors: Brian Umbach, Peoria, IL (US); Matthew Trone, Pekin, IL (US); William Baar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 731 days.

(21) Appl. No.: 16/215,751

(22) Filed: Dec. 11, 2018

(65) Prior Publication Data

US 2020/0180714 A1  Jun. 11, 2020

(51) Int. Cl.
| | | |
|---|---|---|
| *B62D 55/15* | (2006.01) | |
| *B62D 55/088* | (2006.01) | |
| *B62D 55/092* | (2006.01) | |
| *B62D 55/10* | (2006.01) | |
| *B62D 55/06* | (2006.01) | |
| *B62D 55/20* | (2006.01) | |

(52) U.S. Cl.
CPC .............. *B62D 55/15* (2013.01); *B62D 55/06* (2013.01); *B62D 55/088* (2013.01); *B62D 55/092* (2013.01); *B62D 55/10* (2013.01); *B62D 55/20* (2013.01)

(58) Field of Classification Search
CPC ...... B62D 55/10; B62D 55/14; B62D 55/145; B62D 55/15; B62D 55/088; B62D 55/092; B62D 55/32
See application file for complete search history.

(56) References Cited

U.S. PATENT DOCUMENTS

| | | | | |
|---|---|---|---|---|
| 2,952,495 | A | | 9/1960 | Herr, Jr. |
| 4,141,598 | A | * | 2/1979 | Cline ..................... B62D 55/15 305/138 |
| 5,785,395 | A | * | 7/1998 | Crabb ................... B62D 55/14 180/9.54 |
| 8,075,068 | B2 | | 12/2011 | VanderVeen |
| 9,745,005 | B2 | | 8/2017 | Johannsen |
| 10,023,251 | B2 | | 7/2018 | Recker |
| 2010/0096196 | A1 | | 4/2010 | Vanderveen |
| 2016/0244111 | A1 | * | 8/2016 | Schierschmidt ....... B62D 55/14 |
| 2017/0050686 | A1 | * | 2/2017 | Kaufmann ........... B62D 55/088 |
| 2017/0050687 | A1 | | 2/2017 | Kaufmann |
| 2019/0077474 | A1 | * | 3/2019 | Nagaoka ................ B62D 55/14 |

FOREIGN PATENT DOCUMENTS

| | | | |
|---|---|---|---|
| CN | 207843099 | 9/2018 | |
| KR | 870004010 Y1 * | 12/1987 | ............. B62D 55/15 |
| WO | 8100545 A1 | 3/1981 | |

* cited by examiner

*Primary Examiner* — Jason R Bellinger
*Assistant Examiner* — Emily G. Castonguay
(74) *Attorney, Agent, or Firm* — Brannon Sowers & Cracraft (57) ABSTRACT

A machine system includes a roller frame and a roller assembly mounted to the roller frame. The roller assembly includes first and second clamping collars positioned upon a roller shaft and each including a lower and an upper collar section. Fasteners clamp the lower and upper collar sections to the roller shaft to form static seals. The clamping collars may be formed with splitlines to enable the clamping collars to deform so as to simulate interference fits with the roller shaft.

19 Claims, 5 Drawing Sheets

MACHINE SYSTEM HAVING MACHINERY ROLLER ASSEMBLY WITH STATIC SEALING CLAMPING COLLARS

TECHNICAL FIELD

The present disclosure relates generally to a machinery roller assembly, and more particularly to a roller assembly having clamping collars forming static seals at ends of a roller shaft.

BACKGROUND

Rotatable elements are used across all manner of machine systems to enable one piece or part of equipment to rotate against another piece or part of equipment or against some object or material that is to be moved relative to the machinery. One common application of machinery rollers is known from the field of machine track. A machine track in a track-type machine such as an excavator, a track-type tractor, or still others is commonly used to support the weight of the machine upon the tracks as the tracks are advanced in an endless loop about a plurality of rotatable track-engaging elements. Depending upon track design a plurality of so-called track rollers can be mounted underneath or otherwise to a track roller frame and roll across an inside surface of track links or track shoes as the track moves about one or more idlers and a drive sprocket.

Track-type machines can be operated in extraordinarily demanding conditions. The track-type machine itself can be quite heavy and the substrate can include very hard and abrasive materials as well as being uneven. Even in soft underfoot conditions, as might be encountered by excavators working in wet environments, hard and/or protruding objects such as tree stumps can subject track system components to significant, uneven, and repeated loads. In general terms, track systems and the rotatable components within track systems, including track rollers, sprockets, idlers, and still others are robustly designed to prolong service life in these harsh environments. The need for robust design and prolonged service life has motivated engineers to continually seek improved ways to manage loading in machinery roller systems such as track systems, prolong the life of wear components, and establish sophisticated lubrication strategies. One known roller assembly for a track-type machine is set forth in U.S. Pat. No. 9,745,005B2 to Johannsen. Johannsen proposes a roller assembly with a roller shell having a bore that receives a cylindrical shaft. A first collar is disposed between a first end of the shaft and the roller shell and interferingly engaged with the shaft. A second collar is interferingly engaged with an opposite end of the shaft.

SUMMARY OF THE INVENTION

In one aspect, a machine system includes a roller frame and a roller assembly mounted to the roller frame. The roller assembly includes a roller shaft defining a longitudinal shaft axis extending between a first roller shaft end and a second roller shaft end, and a roller body rotatably positioned upon the roller shaft. A first clamping collar and a second clamping collar are positioned, respectively, upon the first roller shaft end and the second roller shaft end, and each include a lower collar section and an upper collar section. The first clamping collar further includes a first fastener clamping the lower and upper collar sections to the first roller shaft end to form a first static seal extending circumferentially around the roller shaft, and the second clamping collar includes a second fastener clamping the lower and upper collar sections to the second roller shaft end to form a second static seal extending circumferentially around the roller shaft.

In another aspect, a machinery roller assembly includes a roller shaft defining a longitudinal shaft axis extending between a first roller shaft end and a second roller shaft end, and a roller body rotatably positioned upon the roller shaft and including an outer tread surface, and an inner surface extending circumferentially around the roller shaft. The machinery roller assembly further includes a first clamping collar including a lower collar section and a upper collar section, and a first fastener clamping the lower collar section and the upper collar section to the first roller shaft end to form a first static seal extending circumferentially around the roller shaft, and a second clamping collar including a lower collar section and an upper collar section, and a second fastener clamping the lower collar section and the upper collar section to the second roller shaft end to form a second static seal extending circumferentially around the roller shaft.

In still another aspect, a clamping collar for a machinery roller assembly includes a collar body having an upper collar section and a lower collar section, and a splitline dividing the upper collar section and the lower collar section. The collar body further includes a clamp and a seal carrier each formed in part by the upper collar section and the lower collar section. The collar body has formed therein a shaft bore that extends through each of the clamp and the seal carrier, and a plurality of fastener bores for clamping the lower collar section and the upper collar section together at the splitline.

DETAILED DESCRIPTION

Figure 1:
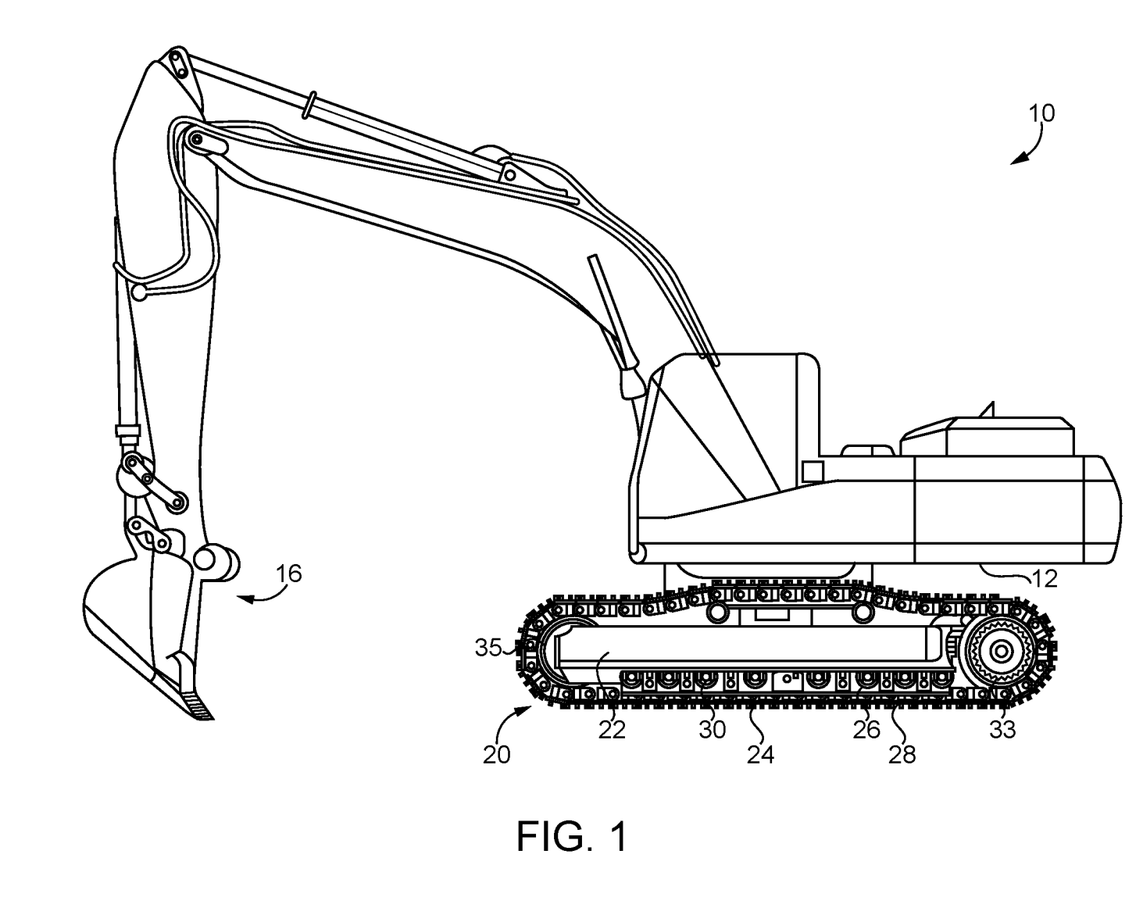
FIG. 1 is a side diagrammatic view of a machine including a machine system, according to one embodiment.

Referring to FIG. 1, there is shown a machine 10 according to one embodiment and including a frame 12 and an implement system 16 mounted to frame 12. Machine 10 further includes a machine system 20 shown as a ground-engaging track system positioned at one side of frame 12. In the illustrated embodiment a substantially identical ground-engaging track system is mounted at an opposite side of frame 12 but not visible in the view of FIG. 1. Machine system 20 can include a roller frame 22 and a track 24 extending about a drive sprocket 33 and an idler 35. Track 24 is an oval track as illustrated, but could be a "high drive" track configuration in other embodiments. Track 24 includes a plurality of coupled-together track links 26 attached to a plurality of track shoes 28 in a generally conventional manner. Machine system 20 further includes a plurality of machinery roller assemblies 30 mounted to roller frame 22. Machine 10 is illustrated as an excavator, however, it should be appreciated that a variety of other machine types are contemplated within the context of the present disclosure such as a track-type tractor or other tracked machine. Machine system 20 might be alternatively structured as a conveyor, an industrial process machine, or part of a manufacturing system such as in an assembly line, to name a few examples. Roller assemblies 30 may rotate in contact with track links 26 and bear at least a majority of a weight of machine 10 in many embodiments. As will be further apparent from the following description roller assemblies 30, hereinafter discussed in the singular, may be uniquely structured for robust sealing of lubricating fluids contained therein.

Figure 2:
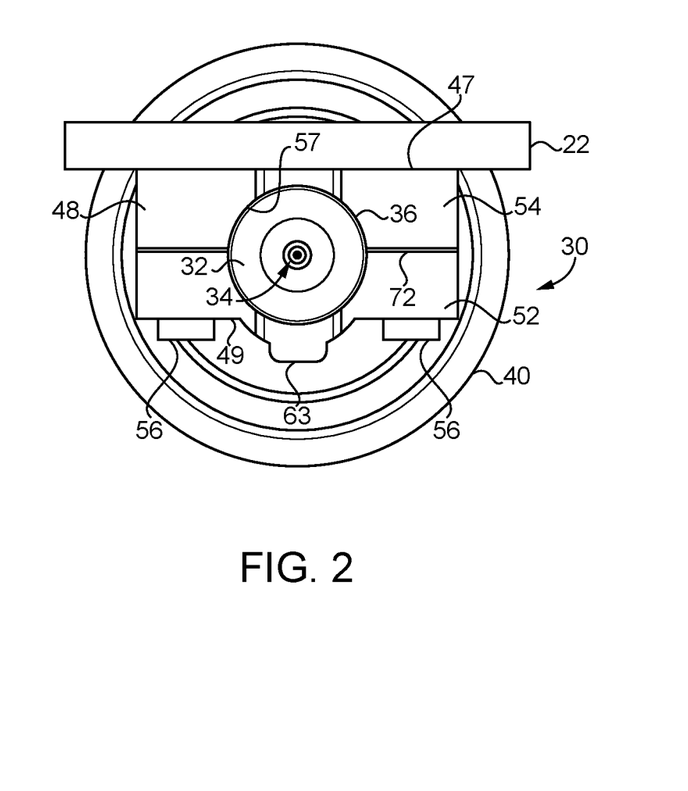
FIG. 2 is an end view of a machinery roller assembly mounted to a roller frame, according to one embodiment.
Figure 3:
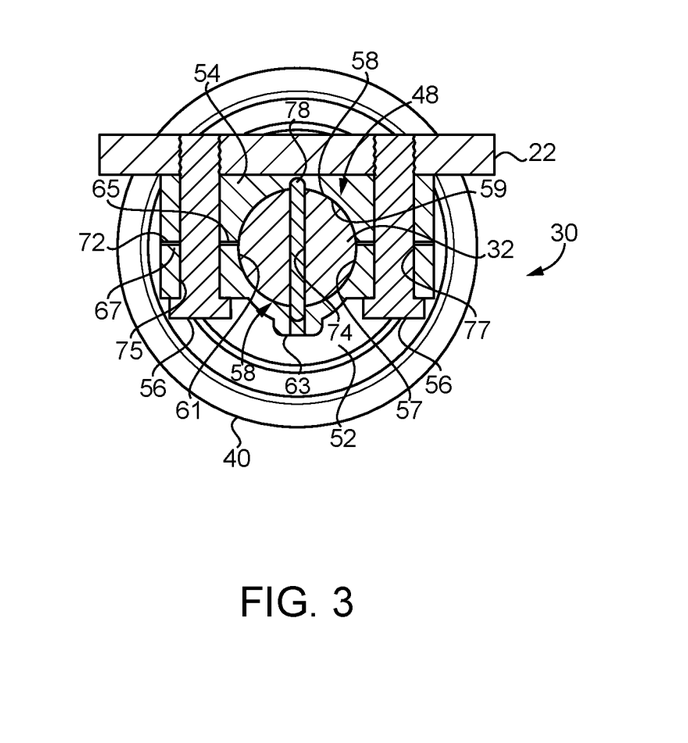
FIG. 3 is a sectioned end view through a machinery roller assembly mounted to a roller frame, similar to FIG. 2.
Figure 4:
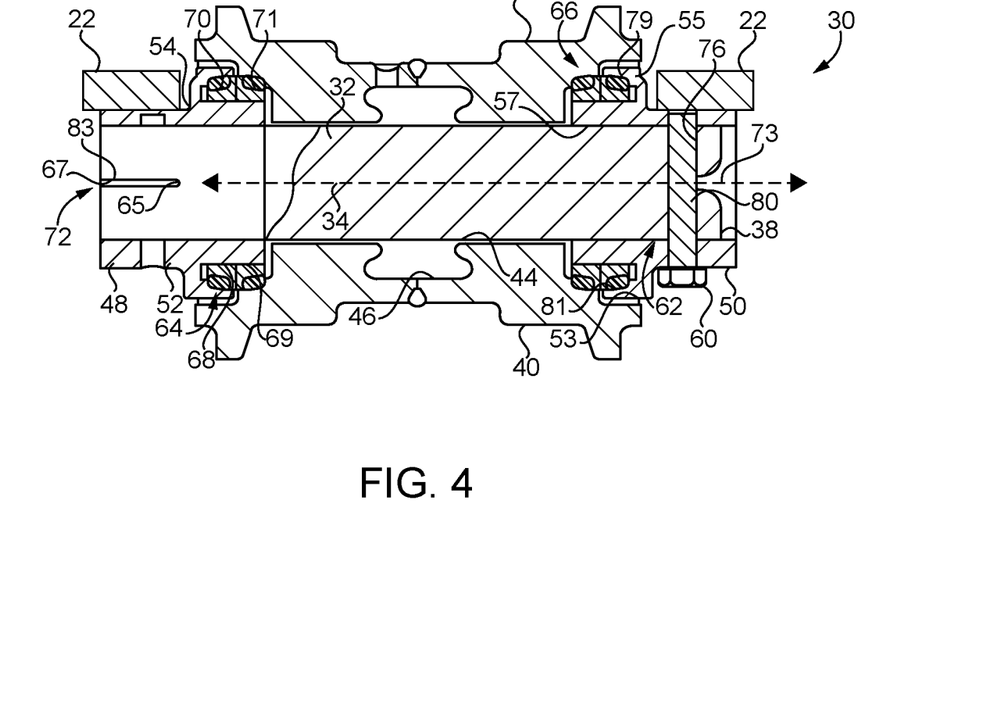
FIG. 4 is a sectioned side diagrammatic view of the roller assembly and roller frame depicted in FIG. 2 and FIG. 3.

Referring also now to FIGS. 2-4 there are shown features of roller assembly 30 in greater detail. As noted above, roller assembly 30 may be mounted to roller frame 22. Roller assembly 30 includes a roller shaft 32 defining a longitudinal shaft axis 34. Longitudinal shaft axis 34 extends between a first roller shaft end 36 and a second roller shaft end 38. Roller assembly 30 also includes a roller shell or body 40 rotatably positioned upon roller shaft 32. Roller body 40 includes an outer tread surface 42 that may be shaped to contact whatever machine components or objects are desired, and in the illustrated case is non-cylindrical and structured to contact two parallel track chains. Roller body 40 further includes an inner surface 44 extending circumferentially around roller shaft 32. A cavity 46 may be formed between roller body 40 and roller shaft 32 and contains a lubricating fluid to lubricate an interface of contact between roller body 40 and roller shaft 32. In alternative embodiments bushings or bearings, for example, could be positioned between roller body 40 and roller shaft 32. As discussed above, track-type machines, and other types of machines, can include rotatable components subjected to side loads, bending loads, twisting loads, and still others. Roller assembly 30 can be structured to inhibit or minimize leakage of lubricating fluid out of cavity 46 and between or among components of roller assembly 30 in response to such loads during service.

Roller assembly 30 further includes a first clamping collar 48 and a second clamping collar 50 positioned, respectively, upon first roller shaft end 36 and second roller shaft end 38. Each of first and second clamping collars 48 and 50 includes a lower collar section 52, 53 and an upper collar section 54, 55. It will be appreciated that first and second clamping collars 48 and 50 may be substantially identical in at least certain embodiments, and therefore the present description of either one of first or second clamping collars 48 and 50 can be understood by way of analogy to refer to the other of first or second clamping collars 48 and 50. The terms "upper" and "lower" in reference to collar sections 52, 53 and 54, 55 are used in a relative sense and not intended to mean that any collar section will always be positioned for service in an upper location or a lower location, as such terms depend upon perspective. In the illustrated case upper collar section 54, 55 is fastened to roller frame 22, however, embodiments are contemplated where lower collar section 52, 53 is fastened to roller frame 22, or where both lower collar section 52, 53 and upper collar section 54, 55 are attached to one or more roller frames. In the illustration of FIG. 2 it can be noted that first clamping collar 48 includes a planar upper mounting surface 47 formed on upper collar section 54, and a lower bolting surface 49 formed on lower collar section 52. First clamping collar 48 further has a shaft bore 57 formed therein that receives roller shaft 32 and generally extends circumferentially around longitudinal shaft axis 34. First clamping collar 48 further includes a first fastener 56 clamping lower and upper collar sections 52 and 54 to first roller shaft end 36 to form a first static seal 58 extending circumferentially around roller shaft 32. In the illustrated case first clamping collar 48 includes a plurality of fasteners 56 positioned outboard, to the front and the rear, of shaft bore 57. Second clamping collar 50 further includes a second fastener 60, in the illustrated case a plurality of fasteners 60, clamping lower and upper collar sections 53 and 55 to second roller shaft end 36 to form a second static seal 62 extending circumferentially around roller shaft 32. Each of first static seal 58 and second static seal 62 can include a metal-to-metal static seal. An adhesive such as a suitable adhesive commercially available under the trade name Loctite® can be placed between abutting surfaces of first and second clamping collars 48 and 50 and roller shaft 32 to enhance the static seal. As further discussed herein roller shaft 32 may be interference fitted with first and second clamping collars 48 and 50 by way of the clamping action of fasteners 56 and 60.

As shown in FIG. 3, upper collar section 54 includes a clamping face 67 and lower collar section 52 includes a clamping face 65. Clamping of upper collar section 54 and lower collar section 52 together brings clamping faces 65 and 67 into sealing contact with one another and also brings inner surfaces of first clamping collar 48 that form shaft bore 57 in contact with roller shaft 32 to produce the corresponding static seal 58. First fasteners 56 fasten first clamping collar 48 to roller frame 22 and second fasteners 60 fasten second clamping collar 50 to roller frame 22.

In the embodiment of FIGS. 2-4 each of first and second clamping collars 48 and 50 includes splitlines 72 and 73 dividing the corresponding upper and lower collar sections 54, 55 and 52, 53. Splitlines 72 and 73 may be formed by a slot 83 that extends partially through an axial length of first and second clamping collars 48 and 50 such that lower and upper collar sections 52, 53 and 54, 55 are each one piece divided in part by splitlines 72 and 73, respectively.

It can also be noted from the sectioned end view of FIG. 3 that shaft bore 57 is formed by a half bore 59 in upper collar section 54 and another half bore 61 formed in lower collar section 52. Half bore 59 and half bore 61 might each form, or one of half bore 59 and half bore 61 form, less than one half of a full circle when clamping collar 48 is not yet clamped about and to roller shaft 32 by way of fasteners 56. Alternatively, half bore 59 and half bore 61 could together form a full circle that is undersized relative to a circle formed by roller shaft 32. Any of these configurations could enable an interference fit as discussed herein. It can be seen also from FIG. 3 that fasteners 56 extend through a first fastener bore 75 and a second fastener bore 77 and are threadedly engaged in roller frame 22 in the illustrated embodiment. As fasteners 56 are engaged with roller frame 22 upper collar section 54 and lower collar section 52 are squeezed together to deform half bore 59 and half bore 61 to half circular shapes or to enlarge a full circle formed thereby, such that roller shaft 32 is effectively interference fitted within shaft bore 57. Roller assembly 30 further includes a first pin bore 74 extending through first roller shaft end 36 and each of lower and upper collar sections 52 and 54 of first clamping collar 48, and a second pin bore 76 extending through second roller shaft end 38 and each of lower and upper collar sections 53 and 55 of second clamping collar 50. A first pin 78 fixes an axial location of first clamping collar 48 upon roller shaft 32. A second pin 80 fixes an axial location of second clamping collar 50 upon roller shaft 32, with first and second pins 78 and 80 being received within first pin bore 74 and second pin bore 76. Lower collar section 52, and analogously lower collar section 53, includes a boss 63 with pin 78 being passed through boss 63 by way of pin bore 74. First and second pins 78 and 80 may be installed in roller assembly 30 prior to fastening roller assembly 30 to roller frame 22.

Figure 8:
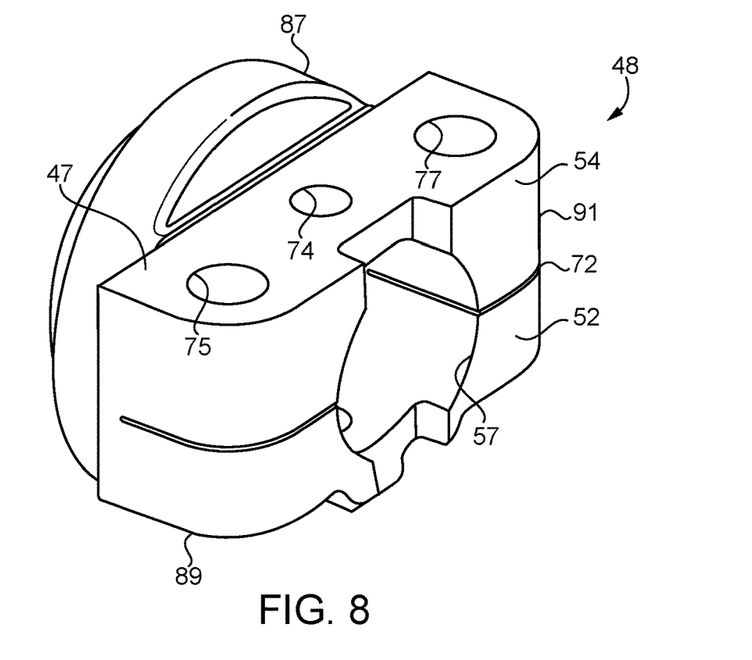
FIG. 8 is a diagrammatic view, in perspective, of a clamping collar, according to one embodiment.

Roller assembly 30 further includes a first dynamic seal 64 held in axial compression between first clamping collar 48 and roller body 40, and a second dynamic seal 66 held in axial compression between second clamping collar 50 and roller body 40. Each of first and second dynamic seals 64 and 66 may include a metal face seal having an annular seal ring 68 fixed to rotate with roller body 40, and an outer seal ring 69. First pin 78 may fix an axial location of first clamping collar 48 to set an axial compression of first dynamic seal 64 whereas second pin 80 can fix an axial location of second clamping collar 50 to fix an axial compression of second dynamic seal 66. First dynamic seal 64 includes a first sealing element 70, such as a rubber O-ring, and second dynamic seal 66 includes a second sealing element 71, such as a second rubber O-ring. In the illustrated embodiment second clamping collar 50, and by way of analogy first clamping collar 48, includes a seal flange 79 extending circumferentially around longitudinal shaft axis 34 and projecting axially inward, toward an axial center point of a line segment of longitudinal shaft axis 34 defined by roller shaft 32. A seal recess 81 is formed by seal flange 79. Referring also to FIG. 8, there is shown clamping collar 48 in another view. Clamping collar 48 includes a collar body 91 including upper and lower collar sections 54 and 52. Collar body 91 also includes a clamp 89 and a seal carrier 87, each formed in part by upper and lower collar sections 54 and 52. Shaft bore 57 extends through each of clamp 89 and seal carrier 87. It can also be seen that splitline 72 extends part way through clamp 89, and upper and lower collar sections 52 and 54 are formed as one piece.

Figure 5:
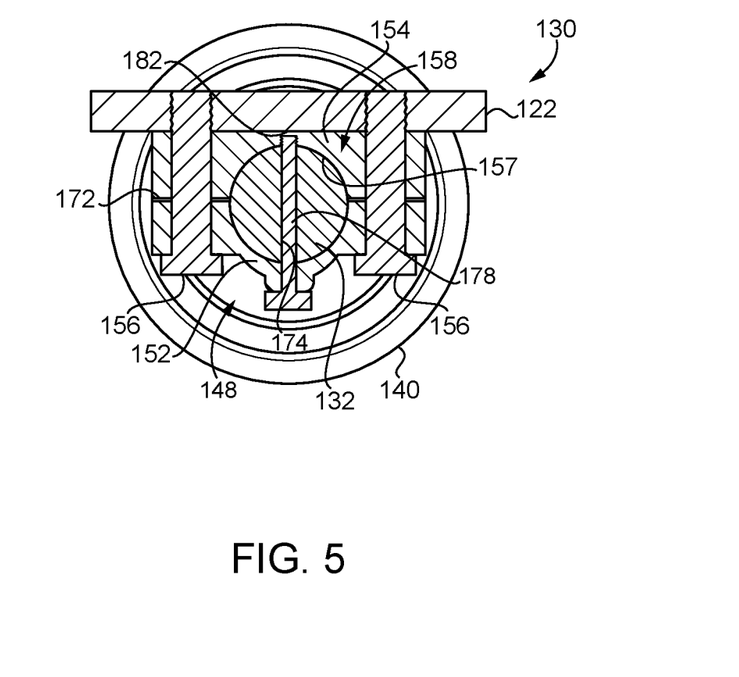
FIG. 5 is a sectioned end view through a machinery roller assembly mounted to a roller frame, according to another embodiment.
Figure 6:
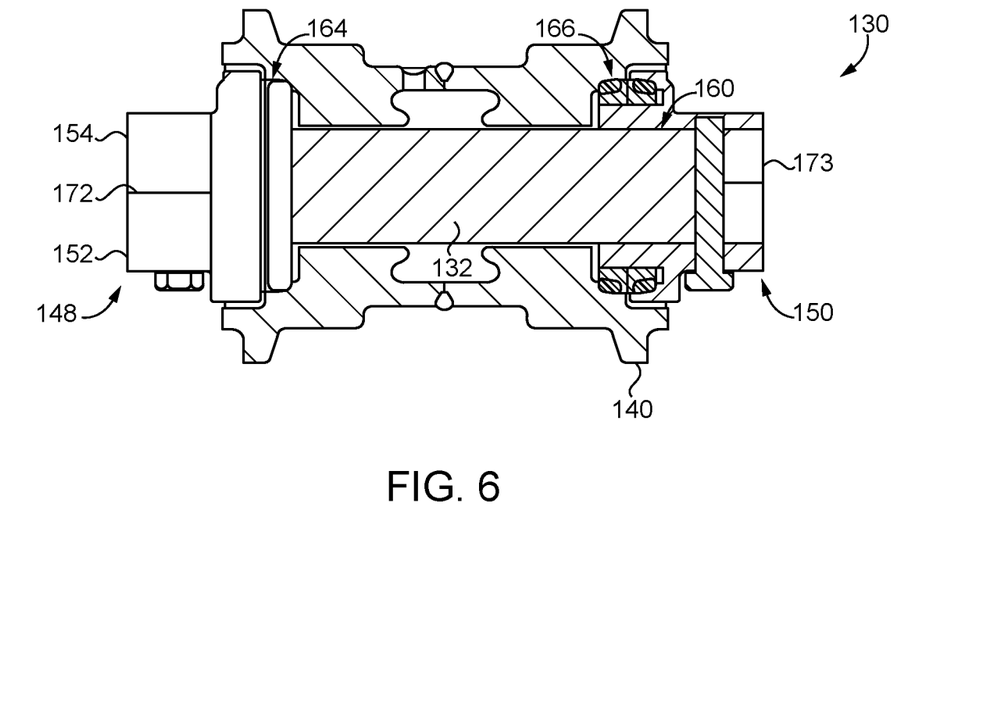
FIG. 6 is a sectioned side view of the machinery roller assembly of FIG. 5.
Figure 7:
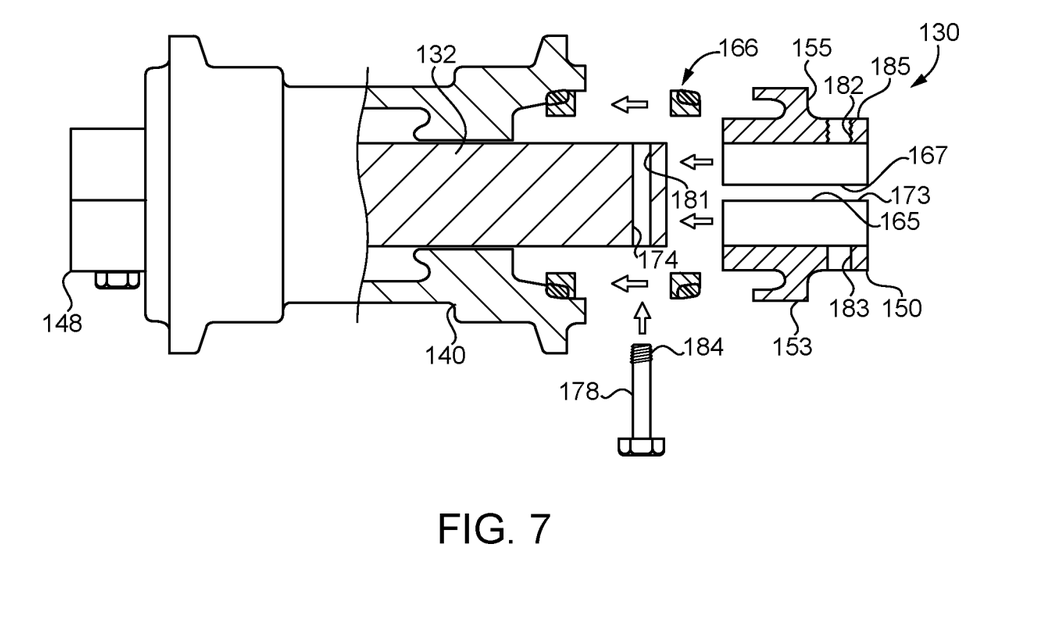
FIG. 7 is a partially sectioned side diagrammatic view, partially disassembled, of the machinery roller assembly of FIGS. 5 and 6.
Figure 9:
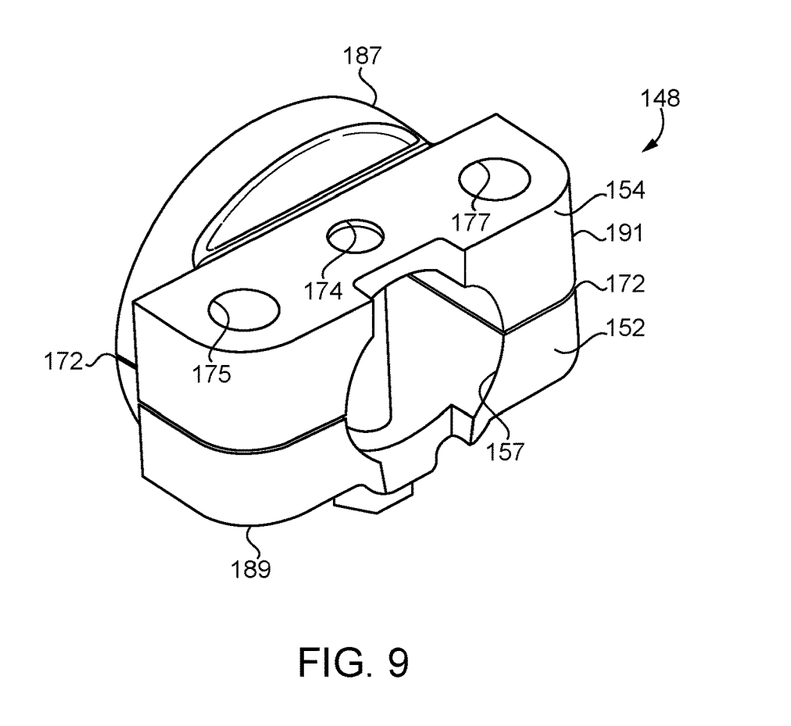
FIG. 9 is a diagrammatic view, in perspective, of a clamping collar, according to another embodiment.

Turning now to FIGS. 5-7 there is shown a roller assembly 130 mounted to a track roller frame 122, according to a different embodiment. Roller assembly 130 includes a roller body 140 rotatably positioned upon a roller shaft 132. Roller assembly 130 further includes a first clamping collar 148 and a second clamping collar 150. Clamping collar 148 includes an upper collar section 154 and a lower collar section 152, divided by a splitline 172. Clamping collar 150 includes analogously structured upper and lower collar sections divided by splitline 173. In contrast to the foregoing embodiment, in the embodiment of FIGS. 5-7, splitlines 172 and 173 divide the corresponding lower and upper collar sections 152 and 154 into separate pieces. Whereas splitlines 72 and 73 extend only partially through their respective clamping collar components, splitlines 172 and 173 extend an entirety of the way through their respective clamping collar components. Roller assembly 130 further includes a first dynamic seal 164 and a second dynamic seal 166 that may be similarly or identically configured to dynamic seals 64 and 66 discussed above. Fasteners 156 are provided to squeeze together upper collar section 154 and lower collar section 152, and may be threadedly engaged with roller frame 122. A pin bore 174 extends through lower collar section 152, upper collar section 154, and through roller shaft 132. The clamping of clamping collar 148 to roller shaft 132 squeezes together upper and lower collar sections 154 and 152 along splitline 172. An analogous construction of clamping collar 150 is also employed. A pin 178, which can include a hex bolt in one embodiment, extends through pin bore 174. Since clamping collar 148, and by analogy clamping collar 150, is formed as separate upper and lower collar sections, pin 178 may fix an axial location of clamping collar 148 for dynamic seal axial compression and can also hold upper and lower collar sections 154 and 152 together until clamping collar 148 is fastened to roller frame 122. Referring also to FIG. 9, there is showing clamping collar 148 in another view. It can be noted lower and upper collar sections 152 and 154 are fully divided by splitline 172. Clamping collar 148 also includes a collar body 191 having a seal carrier 187 and a clamp 189. Fastener bores 175 and 177 are also shown, with pin bore 174 between them. Each of fastener bores 175 and 177, and pin bore 174, is formed in clamp 189. Shaft bore 157 extends through clamp 189 and seal carrier 187.

INDUSTRIAL APPLICABILITY

Referring now to the drawings generally, but in particular to FIG. 7, there is shown machinery roller assembly 130 in a partially disassembled view. Roller body 140 has been positioned upon roller shaft 132 and clamping collar 148 has been clamped to roller shaft 132. Clamping collar 150 has not yet been clamped to roller shaft 132, and dynamic seal 166 is shown as it might appear being installed. Shaft bore 174 is shown extending through roller shaft 132. It can be noted that a first bore section 181 extends all the way through roller shaft 132. A second bore section 183 extends through collar section 153 and a third bore section 185 extends through collar section 155. It will be recalled that clamping collar 150 includes two pieces, as splitline 173 divides clamping collar 150 in two. Also shown is a clamping face 165 of lower collar section 153 and a clamping face 167 of upper collar section 155.

From the state depicted in FIG. 7 the components of clamping collar 150 can be fitted over roller shaft 132, and clamping collar 150 clamped to roller shaft 132. As noted above, clamping to produce first and second static seals 158 and 160 can take place as machinery roller assembly 130 is fastened to roller frame 122. Pin 178 may be passed through pin bore 174 and engaged with upper collar section 155 to hold upper and lower collar sections 153 and 155 in place, at a fixed axial location that sets an axial compression of dynamic seal 166, until such time as machinery roller assembly 130 is fastened to roller frame 122. Pin 178 can include a first set of threads 184, such as external threads, that engage with a second set of threads 182, such as internal threads, formed in bore section 185 of upper collar section 155. Clamping of clamping collar 150 to roller shaft 132 can form second static seal 160. It will also be appreciated that the clamping of clamping collar 150 to roller shaft 132 can squeeze together upper and lower collar sections 155 and 153. The clamping can deform material of the respective clamping collars such that shaft bore 157 assumes a fully circular shape, or enlarges its circular shape, and clamping surfaces 165 and 167 are brought into abutment with one another. It will be appreciated that the present description applies by way of analogy to machinery roller assembly 30, except that in the case of machinery roller assembly 30 instead of squeezing together separate collar sections clamping of clamping collar 48 and clamping collar 50 to roller shaft 32 causes slot 83 to close.

During service, roller body 40, 140 can rotate around roller shaft 32, 132 as track 24 advances about the rotatable track contacting elements. Roller body 40, 140 will thus be understood to roll along and in contact with parallel chains of coupled-together track links. In an alternative machinery roller implementation, the nature of contact between a roller assembly according to the present disclosure and another object or component could be different. As machine system 20 operates it can be expected to experience a variety of loads that can cause roller shaft 32 to be urged to either side, bent, or otherwise disturbed. In certain known machinery roller systems O-rings were fitted into O-ring grooves in a roller shaft such that sealing of lubricating fluids within the roller assembly was achieved by way of a metal-to-rubber or similar material seal. It has been observed that over time due to loading, wear, or other factors, such as low temperatures where non-metallic materials can exhibit sealing problems, lubricating fluids could sometimes leak from within the roller assembly past O-ring seals or the like. According to the present disclosure clamping collars can provide robust metal-to-metal seals that are resistant to the formation of such leak paths.

The present description is for illustrative purposes only, and should not be construed to narrow the breadth of the present disclosure in any way. Thus, those skilled in the art will appreciate that various modifications aright be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A machine system comprising:
   a roller frame;
   a roller assembly mounted to the roller frame and including a roller shaft defining a longitudinal shaft axis extending between a first roller shaft end and a second roller shaft end, and a roller body rotatably positioned upon the roller shaft and rotatable relative to the roller shaft;
   the roller assembly further including a first clamping collar and a second clamping collar positioned, respectively, upon the first roller shaft end and the second roller shaft end, and each including a lower collar section having a first bore surface defining a first circular arc and an upper collar section having a second bore surface defining a second circular arc;
   the first clamping collar further including a first fastener clamping the lower and the upper collar sections to the first roller shaft end to form a first static seal between the first roller shaft end and each respective first bore surface and second bore surface and extending continuously circumferentially around the roller shaft; and
   the second clamping collar further including a second fastener clamping the lower and the upper collar sections to the second roller shaft end to form a second static seal between the second roller shaft end and each respective first bore surface and second bore surface and extending continuously circumferentially around the roller shaft.

2. The machine system of claim 1 wherein a cavity is formed between the roller body and the roller shaft and contains a lubricating fluid, and each of the first and the second static seals inhibits leakage of the lubricating fluid from the cavity.

3. The machine system of claim 1 wherein the first fastener fastens the first clamping collar to the roller frame, and the second fastener fastens the second clamping collar to the roller frame.

4. The machine system of claim 1 wherein each of the first and the second clamping collars includes a splitline dividing the upper and the lower collar sections.

5. The machine system of claim 4 wherein the upper and the lower collar sections in each of the first and the second clamping collars are separate pieces divided by the splitline.

6. The machine system of claim 4 wherein the roller assembly further includes a first pin bore extending through the first roller shaft end and each of the lower and the upper collar sections of the first clamping collar, and a second pin bore extending through the second roller shaft end and each of the lower and the upper collar sections of the second clamping collar.

7. The machine system of claim 4 wherein the roller assembly further includes a first dynamic seal held in axial compression between the first clamping collar and the roller body, and a second dynamic seal held in axial compression between the second clamping collar and the roller body.

8. The machine system of claim 1 further comprising a track chain including a plurality of coupled-together track links, in contact with the roller assembly.

9. A machinery roller assembly comprising:
   a roller shaft defining a longitudinal shaft axis extending between a first roller shaft end and a second roller shaft end;
   a roller body rotatably positioned upon the roller shaft and rotatable upon the roller shaft, and the roller body including an outer tread surface, and an inner surface extending circumferentially around the roller shaft;
   a first clamping collar including a lower collar section forming a first lower half bore and an upper collar section forming a first upper half bore, and a first fastener, each of the lower collar section and the upper collar section including a clamping face, and the first fastener clamping the lower collar section and the upper collar section to the first roller shaft end, such that the clamping faces abut and the first upper half bore and the first lower half bore are deformed against the first roller shaft end to form a first static seal extending circumferentially around the roller shaft; and
   a second clamping collar including a lower collar section forming a second lower half bore and an upper collar section forming a second upper half bore, and a second fastener, each of the lower collar section and the upper collar section including a clamping face, and the second fastener clamping the lower collar section and the upper collar section to the second roller shaft end, such that the clamping faces abut and the second upper half bore and the second lower half bore are deformed against the second roller shaft end to form a second static seal extending circumferentially around the roller shaft.

10. The machinery roller assembly of claim 9 further comprising a first dynamic seal held in axial compression between the first clamping collar and the roller body, and a second dynamic seal held in axial compression between the second clamping collar and the roller body.

11. The machinery roller assembly of claim 10 wherein:
each of the first and the second dynamic seals includes a metal face seal having an inner seal ring fixed to rotate with the roller body, and an outer seal ring; and
the machinery roller further comprises a first pin fixing an axial location of the first clamping collar upon the roller shaft, and a second pin fixing an axial location of the second clamping collar upon the roller shaft.

12. The machinery roller assembly of claim 11 further comprising a first pin bore receiving the first pin and extending through the first roller shaft end and each of the lower and the upper collar sections of the first clamping collar, and a second pin bore receiving the second pin and extending through the second roller shaft end and each of the lower and the upper collar sections of the second clamping collar.

13. The machinery roller assembly of claim 9 wherein each of the first and the second clamping collars includes a splitline dividing the lower and the upper collar sections.

14. The machinery roller assembly of claim 13 wherein:
the first fastener is one of a first set of fasteners clamping the first clamping collar to the roller shaft such that the corresponding upper and lower collar sections are squeezed together along the splitline; and
the second fastener is one of a second set of fasteners clamping the second clamping collar to the roller shaft such that the corresponding upper and lower collar sections are squeezed together along the splitline.

15. The machinery roller assembly of claim 14 wherein the lower and the upper collar sections in each of the first and the second clamping collars are separate pieces divided by the splitline.

16. The machinery roller assembly of claim 14 wherein the lower and the upper collar sections in each of the first and the second clamping collars are each one piece divided in part by the splitline.

17. A clamping collar for a machinery roller assembly comprising:
a collar body including an upper collar section and a lower collar section, and a splitline dividing the upper collar section and the lower collar section;
the collar body further including a clamp and a seal carrier each formed in part by the upper collar section and the lower collar section, and having formed therein a shaft bore that extends through each of the clamp and the seal carrier;
the collar body further having formed therein a plurality of fastener bores for clamping the lower collar section and the upper collar section together at the splitline; and
the collar body further has formed therein a pin bore including internal threads, and the pin bore located in the clamp and extending through the lower collar section and the upper collar section and intersecting the shaft bore.

18. The clamping collar of claim 17 wherein the lower collar section and the upper collar section are separate pieces divided by the splitline.

19. The clamping collar of claim 17 wherein the lower collar section and the upper collar section are one piece divided in part by the splitline.

\* \* \* \* \*